Nov. 8, 1938.    E. W. DAVIS    2,135,563
LUBRICATING APPARATUS
Filed March 11, 1931    4 Sheets-Sheet 1

Nov. 8, 1938.   E. W. DAVIS   2,135,563
LUBRICATING APPARATUS.
Filed March 11, 1931   4 Sheets-Sheet 4

Inventor
Ernest W. Davis
By Williams, Bradbury,
McCaleb & Hinkle.
Attys.

Patented Nov. 8, 1938

2,135,563

UNITED STATES PATENT OFFICE 2,135,563

LUBRICATING APPARATUS

Ernest W. Davis, Oak Park, Ill., assignor, by mesne assignments, to Stewart-Warner Corporation, Chicago, Ill., a corporation of Virginia Application March 11, 1931, Serial No. 521,748

21 Claims. (Cl. 184—7)

My invention relates to lubricating apparatus and is more particularly concerned with an improvement in centralized lubricating systems. My invention further relates to an improved pump mechanism for use with a centralized lubricating system of this type. The lubricating system of my invention is primarily adapted for use with industrial machinery having a large number of bearings to be lubricated, bearings that require lubricant at regular intervals and in different proportions. To accomplish this purpose, resistance units of different sizes are employed at each of the bearings to segregate the desired amount of lubricant for each respective bearing.

The principal object of my invention is to provide an improved lubricating system of the type wherein resistance units are employed at the bearings to allow the desired amount of lubricant to flow to each respective bearing and which are arranged to allow to each bearing a measured discharge of lubricant regardless of the viscosity of the lubricant.

A further object of my invention is to provide an improved automatic pump mechanism for use with a lubricating system of this type.

A further object is to provide an improved automatic pump mechanism having timing means therein which regulate the duration of the discharging period of the pump according to the viscosity of the lubricant.

A further object is to provide an automatic pump which will discharge the same amount of lubricant to the bearings regardless of any change in temperature which may affect the viscosity of the oil or regardless of any other reason whereby the viscosity of the oil is changed.

A further object is to provide an improved pump of this type capable of forcing lubricant to the bearings for intermittent periods under an extremely high pressure and relieving the pressure in the line during the intervening periods.

A further object is to provide an improved mechanism of this type having a pair of continuously operating pumps arranged to cooperate to force lubricant to the resistance units adjacent the bearings at regular intervals and under an extremely high pressure.

Still another object of my invention is to provide an improved pump mechanism of this type which is comparatively simple in construction, yet extremely rugged and durable, and which will not easily become out of order.

Other objects and advantages will be more apparent from the following description, reference being had to the accompanying drawings, in which Fig. 1 is an elevational view of my improved lubricating system, showing the pump mechanism and a plurality of resistance units of the type preferably employed with this system and which are shown in cross-section;

Figure 1:
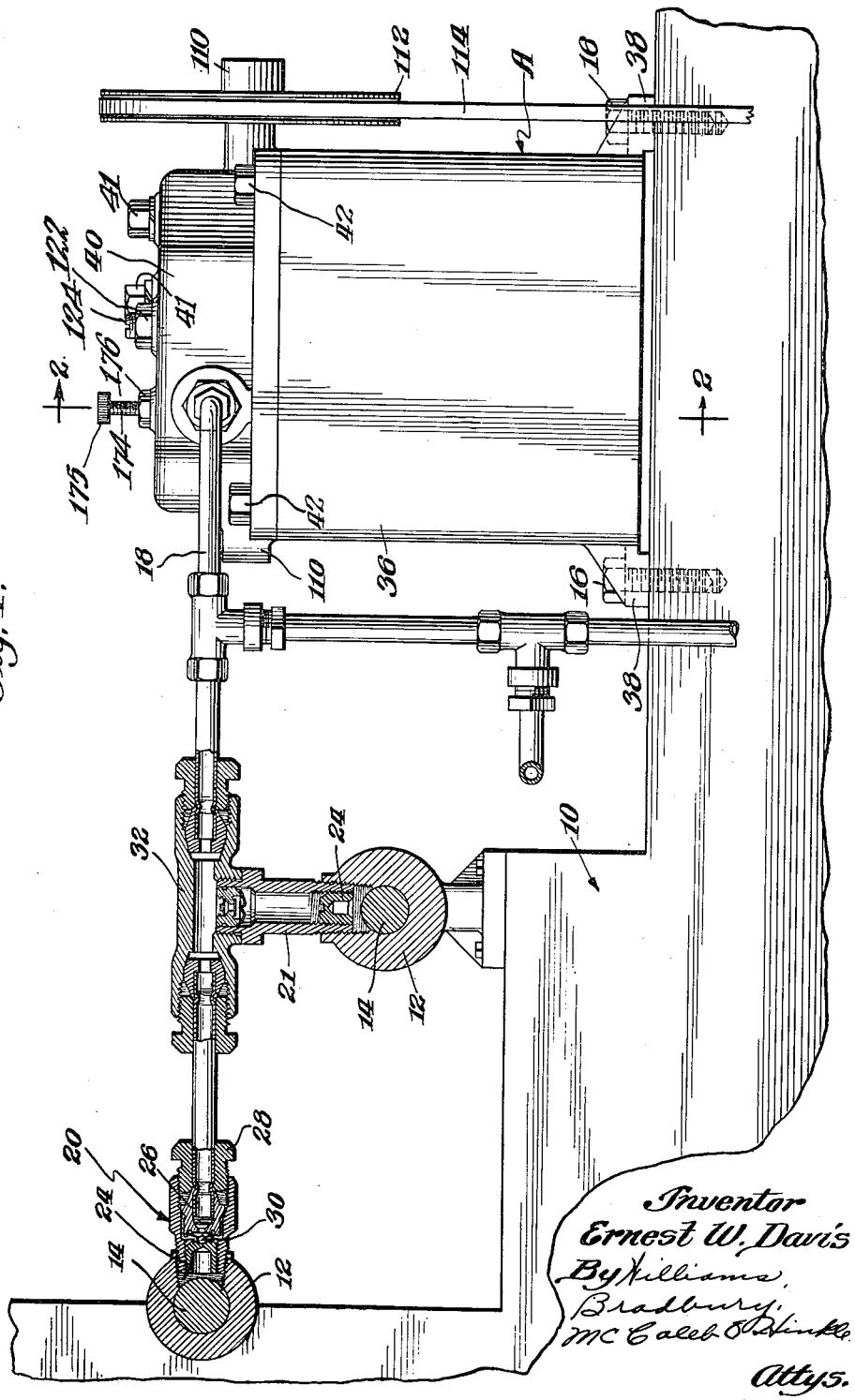

In the drawings, in Fig. 1 I have shown a fragment of a machine 10 which may be of any desirable type of industrial machine having a plurality of moving parts and bearings to be lubricated. A pair of these bearings 12, 12 are shown in cross-section supporting a pair of horizontal shafts 14, 14. A combined pump and reservoir unit A is shown mounted in any convenient place on the machine 10 and securely attached thereto by bolts 16.

A lubricant conduit 18 may extend from unit A to the various bearings upon the machine 10 to be lubricated and terminate in body members 20 and 21 within which the resistance units are mounted. The resistance units employed in this system may be of the general type shown in the application of Charles F. Raisch, filed August 26, 1929, and bearing Serial Number 388,332, and will not be described herein in any great detail. Generally speaking, these resistance units may comprise a body 20 having a central axial bore therein. The lower end of the bore is threaded to receive a resistance plug 24. A sealing member 26, adapted to cooperate with a bushing 28 to connect the body 20 to conduit 18, is also located in said bore. The sealing member 26 is arranged to support a check valve 30. The details of all of these parts are more clearly disclosed in the above-mentioned application.

The body member 21 is similar in all respects to the body member 20 except that the body member 21 carries a member 32 whereby a T connection may be made in the conduit line 18. The resistance units, generally speaking, are adapted to be of the desired size to permit discharge of lubricant at the desired rate to each particular bearing when lubricant under a high pressure is forced through the conduit line 18.

Referring now more particularly to the unit A, which comprises a combined pump and reservoir unit, I provide a hollow base casting 36 having lugs 38 through which the bolts 16 pass to secure the unit to the machine 10. An inverted cup-shaped cap member 40, positioned upon the top of base 36, effectively closes its upper end and is fastened thereto by means of cap screws 42.

Figure 2:
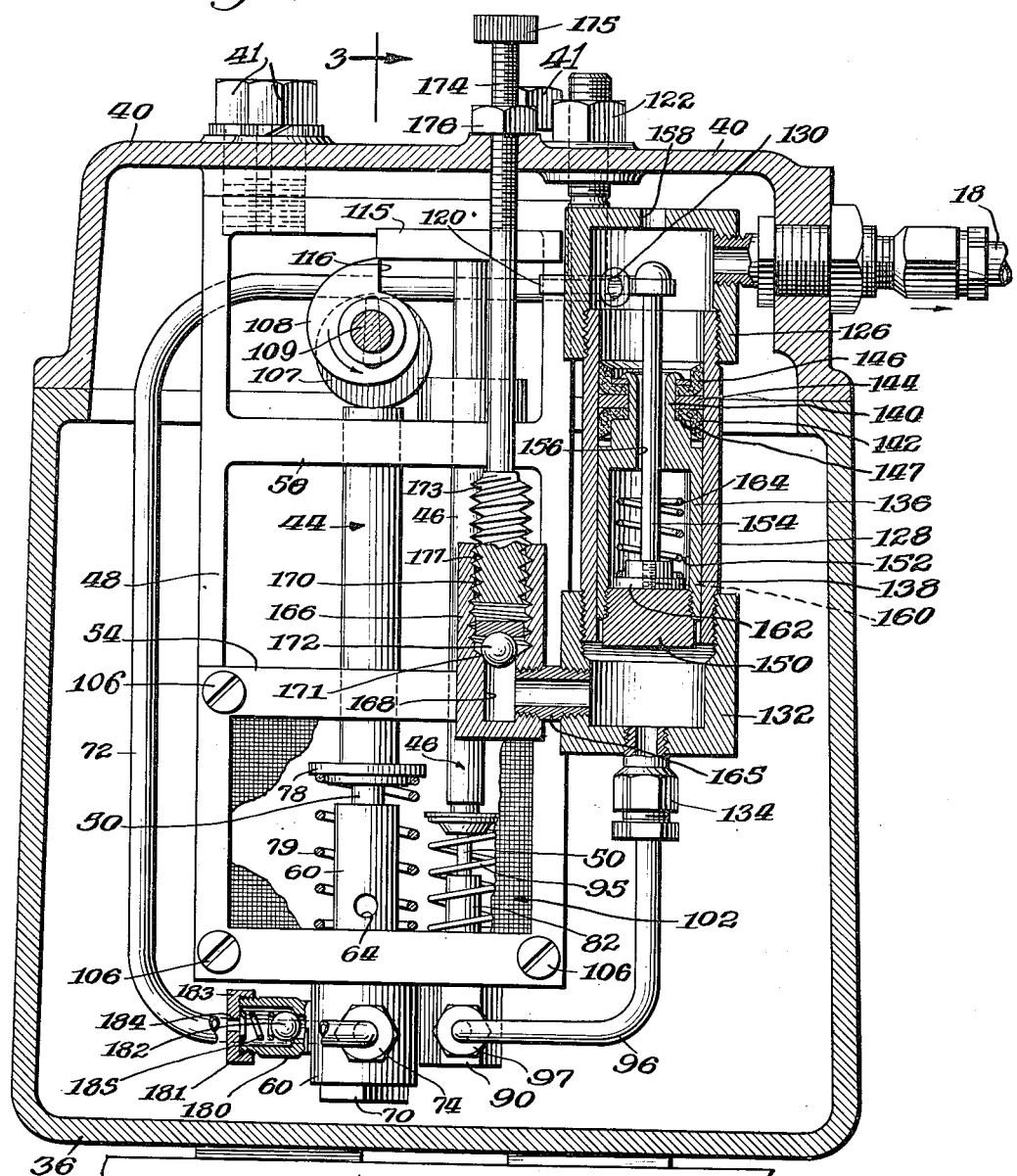
Fig. 2 is a vertical sectional view of the pump mechanism, taken on the line 2—2 of Figs. 1 and 4.
Figure 3:
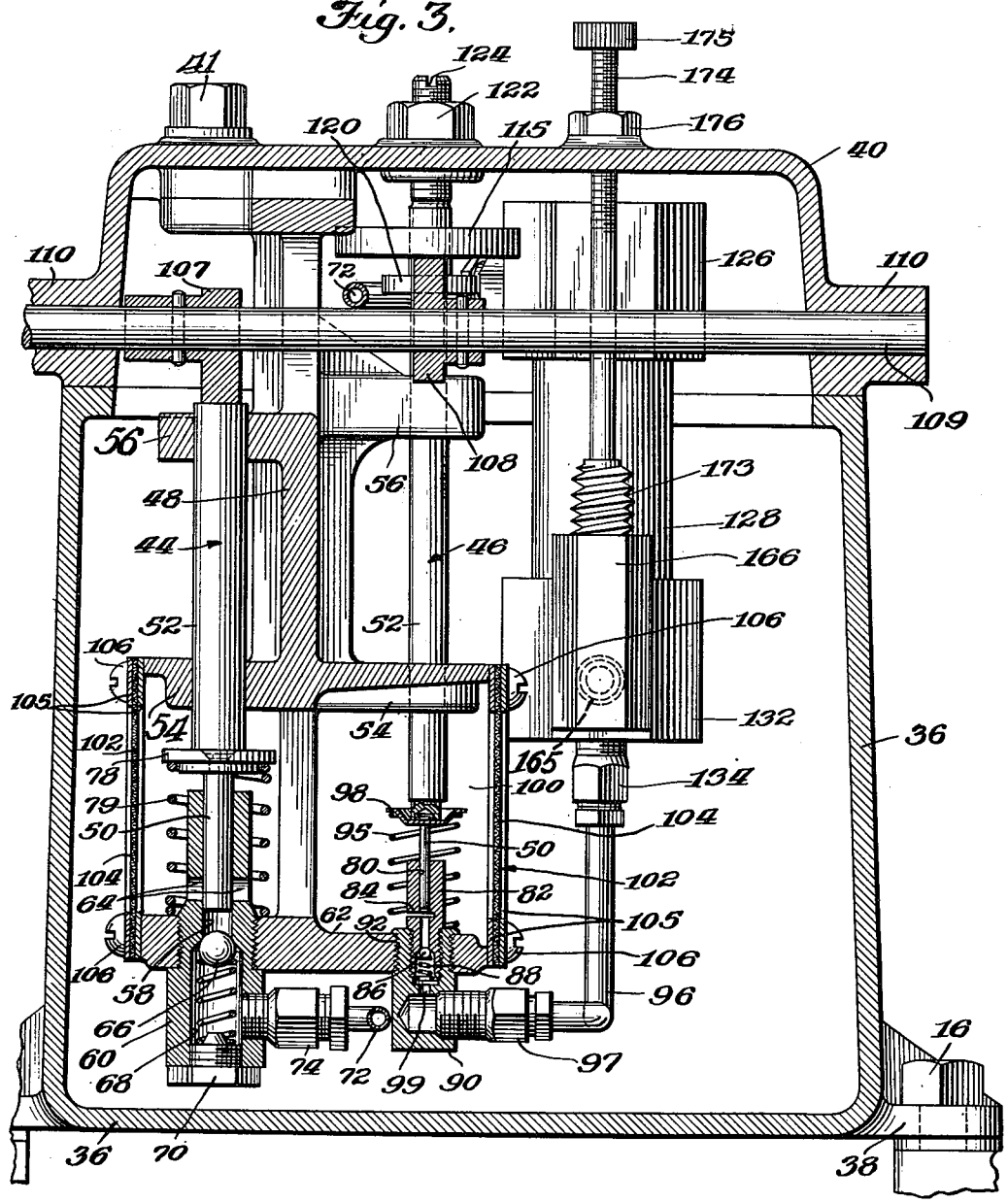
Fig. 3 is a vertical sectional view of the pump mechanism taken on the line 3—3 of Fig. 2, with the drive pulley omitted which corresponds with the view taken generally on the staggered line 3—3 of Fig. 4.
Figure 4:
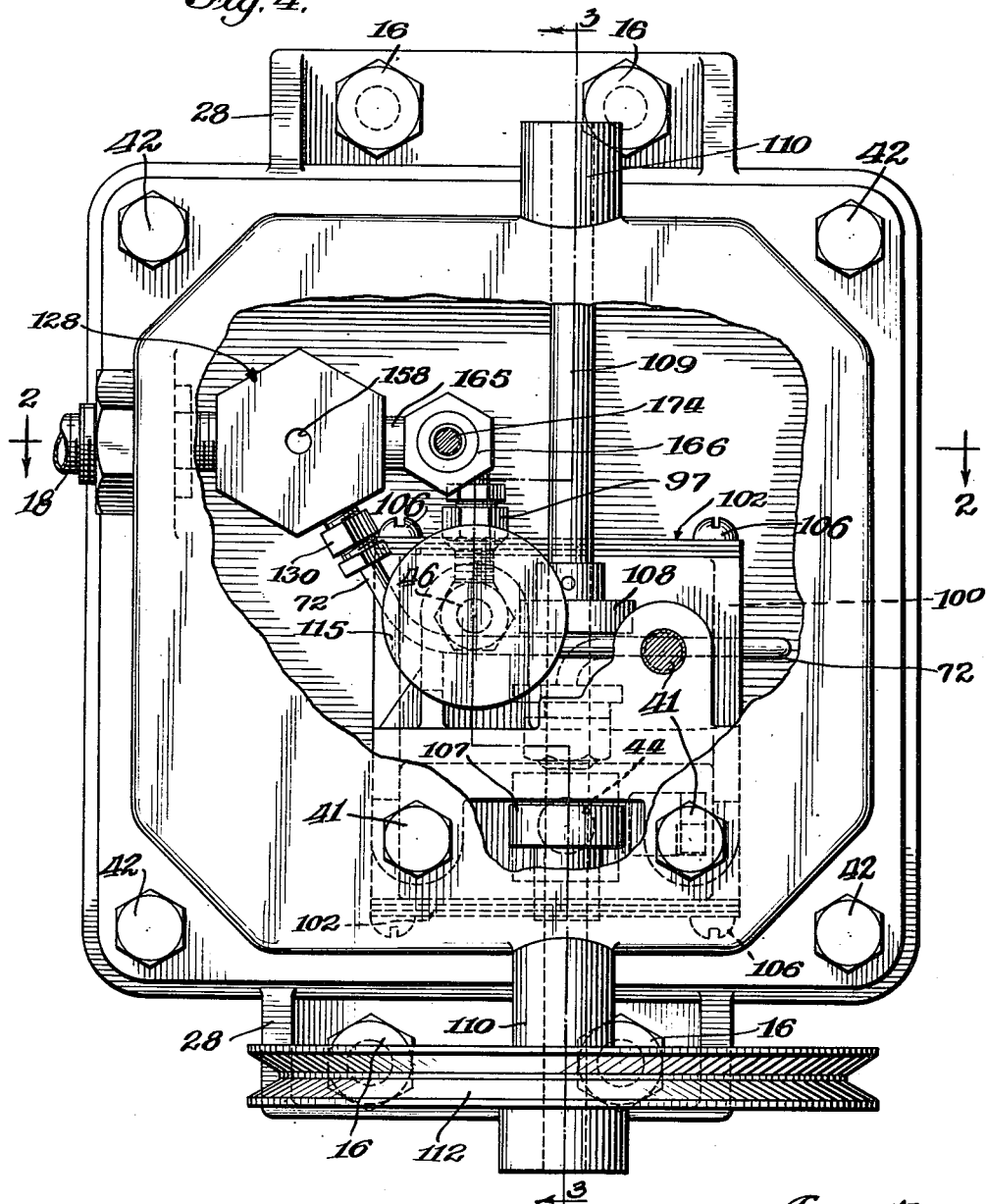
Fig. 4 is a top plan view of the pump mechanism, with the cover partially broken away to illustrate more clearly other parts.

Referring now more particularly to Figs. 2 and 3, a pair of pump mechanisms 44 and 46 are provided, one of which, 44, is adapted to pump lubricant to the bearings, and the other, 46, is adapted to pump lubricant to a control device hereinafter to be described. Both of the pump mechanisms are carried by a unitary frame member 48 which is secured to the under side of cap member 40 by means of bolts 41.

As most clearly shown in Fig. 3, each pump unit comprises a plunger 50 engaged by an enlarged stem 52 journalled in a plurality of lateral flanges 54 and 56 of the frame member 48. The plunger 50 of pump 44 is reciprocated in the vertical bore 58 of a cylinder block 60 which is screw threadedly mounted in a lower lateral flange 62 of the frame 48. A pair of inlet ports 64 in the cylinder block communicate with bore 58. A spring-pressed valve 66, which normally closes the lower end of bore 58, is located in an enlarged chamber 68 in the cylinder block 60 and the lower end of this chamber is closed by a screw plug 70.

A conduit 72 is connected to the cylinder block 60 by a connector bushing 74 through which the conduit is in communication with chamber 68. A cap member 78 is attached to the upper end of plunger 50 on a reduced end thereof and contacts the stem 52. A compression spring 79, arranged between cap 78 and flange 62, holds the plunger 50 in engagement with the enlarged stem 52.

Pump 46 is generally similar to pump 44, being provided, however, with a plunger 50 of a relatively small diameter which reciprocates in a bore 80 in cylinder block 82. A slotted opening 84 through one wall of the cylinder block provides an inlet port to the bore 80 which is closed at its lower end by a ball check valve 86 located in an enlarged chamber 88 in the lower end of the block. The cylinder block is screw-threadedly mounted in a supporting member 90 which has a reduced end portion adapted to fasten into a tapped bore 92 in flange 62. A conduit 96 is secured in member 90 by a suitable connector bushing 97 and communicates through passageway 99 with chamber 88.

A cap member 98 is connected to the upper end of plunger 50 on a reduced end thereof and contacts with stem 46. A compression spring 95, arranged between cap 98 and flange 62, holds the plunger 50 in engagement with the lower end of the enlarged stem 46.

A pair of vertical side walls 100 connect flanges 54 and 62 of the frame 48, leaving more or less rectangular openings in the frame casting through which lubricant may reach the pumps 44 and 46. These openings are closed by suitable strainers 102 which are similar in all respects and preferably comprise a wire mesh screen 104 supported by a pair of rectangular frame members 105 and fastening screws 106.

Pumps 44 and 46 may be actuated in a number of different ways, and in the embodiment of the invention shown in the drawings a pair of cams 107 and 108 are provided. These cams are pinned to a drive shaft 109. Shaft 109 is journalled in a pair of bearings 110 in cap 40 and extends from the cap at one end where a pulley 112 is mounted thereon. Pulley 112 may be driven by means of a suitable belt 114 from any rotating part of the machine 10, such part being determined from the particular construction and lubrication requirements of the particular machine upon which the lubricating unit A may be mounted.

As most clearly shown in Fig. 2, cam 107 is an eccentric situated above the upper end of plunger stem 52 of pump 44 and as it rotates, forces plunger 50 down in bore 58, and spring 79, situated between cap 78 and flange 62, forces plunger stem 52 upward and also raises plunger 50 in bore 58. Pump 46 may be similarly driven. However, in this embodiment of the invention it has been shown as a gravity operated pump plunger stem 52 having a disk 115 secured to its top end and engaged by cam 108. The cam raises the plunger stem and permits spring 95, positioned between flange 62 and cap 98 attached to the top of plunger 50, to raise the plunger in the cylinder block 82. As the cam revolves, disk 115 drops from the edge 116 of the cam and urges plunger 50 downward. Means for adjusting the length of this stroke is provided in the form of a limit stop member 120 screw-threadedly supported in cover 40. The position of the stop member may be varied by loosening lock nut 122 and inserting a screw-driver in slot 124 and moving the stop member up or down.

As previously mentioned, pump 44 will force lubricant into conduit 72 which extends from cylinder block 60 to the head member 126 of a timing device or temporary reservoir 128, being connected thereto by a suitable connector bushing 130. Lubricant discharge conduit 18 extends through a wall of cover 40 and is attached to head member 126, suitable lock nuts and bushings being provided where the conduit passes through the wall of cover 40. As thus far described, it will be obvious that lubricant under pressure will be continuously pumped to the upper end of the combined timing or reservoir unit 128.

Pump 46 is connected through conduit 96 with a lower cap member 132 of reservoir 128 by a suitable connector bushing 134. A reciprocable piston 136 is mounted in reservoir 128 and comprises generally a cylindrical body member 138 having a reduced upper end portion 140. An inverted cup leather washer 142, a retaining member 144, and an upwardly turned cup leather washer 146, are all mounted upon the reduced end portion 140 which is upset at its upper end to securely fasten these elements against a shoulder 147. A chamber 152 in body member 138 is closed at its lower end by a plug member 150. A valve 154 is positioned in chamber 152 and extends upwardly through an aperture 156 in the upper end of piston 136. The upper end of the valve is hemispherically shaped to close an outlet 158 in the upper wall of head member 126. Valve 154 has a reduced threaded lower end 160 upon which a flanged member 162 is secured. A spring 164 is carried by the flanged member 162.

A pipe union 165 is secured between the lower cap 132 and a body member 166. The member 166 is provided with a vertical bore 168, the upper end of which is enlarged and V-threaded as shown at 170. A tapered wall 171 connects the bores and provides a seat for a gravity operated ball check valve 172. A threaded plug 173, arranged at the lower end of a bolt 174 which is mounted in cap 40, is arranged to be screw-threadedly mounted in the tapped bore 170.

Bolt 174 carries at its upper end a knurled handle 175 and a lock nut 176. The V-shaped threads 170 are arranged to have their pointed edges removed so that when plug 173 is screw-threadedly mounted in the threaded bore a spiral passageway 177 will be formed between these parts. By this arrangement a resistance unit, similar to those employed at the various bearings, is provided.

The distance that resistance plug 173 is screw-threaded into tapped bore 170 will determine the amount of lubricant of a certain viscosity which will pass through the timing valve thus provided in a given period of time. It is obvious that the higher the viscosity of the lubricant, the more time will be required for a definite quantity of lubricant to pass through the valve.

In operation, my improved pumping device may be located upon an industrial machine which has bearings to be lubricated and which has a moving element adapted to drive shaft 109 by means of belt 114 and pulley 112. The two pumps in reservoir A will thus be continuously operated through the medium of cams 107 and 108.

Assuming that the hollow base casting 36 is filled with lubricant, it will thus be evident that pump 44 will pump lubricant through conduit 72 into the upper end of auxiliary reservoir 128 and pump 46 will pump a smaller quantity of lubricant into the lower end of reservoir 128. Lubricant pumped into the upper end of the reservoir may escape through opening 158 but as a lubricant pressure is built up in the lower end of the reservoir, piston 138 will gradually be raised until valve 154 closes the outlet 158 in the upper end of the reservoir. At this time lubricant being pumped through conduit 72 will be forced out through conduit 18 to the various flow measuring devices, such, for example, as 20 and 21. Due to the fact that the lubricant is being pumped under an extremely high pressure, lubricant will be forced through the resistance plugs of the units 20 and 21 at a definite rate of travel.

As the conduit 18 and all of the measuring units become filled with lubricant, the lubricant pressure in the upper end of reservoir 128 will serve to force lubricant through the measuring units, the pressure gradually being built up to a point where it is sufficient to cause piston 138 to descend. Valve 154, however, will remain seated in opening 158, due to the lubricant pressure, until spring 164 engages the upper end of chamber 152, and the spring will be compressed until the lubricant pressure in the upper end of the chamber is sufficiently great to force valve 154 down, at which time, due to the fact that spring 164 has been compressed, the valve stem will spring downwardly, thus sharply and quickly opening port 158, and allow the lubricant to overflow therethrough from the upper end of the chamber, thus relieving the pressure in the line 18.

During the period of time in which valve 154 closes opening 158, the lubricant being pumped into the lower end of reservoir 128 flows through union 165 into the interior of member 166. As the amount of lubricant increases the lubricant raises check valve 172 and flows through the spiral passageway 177 of the resistance unit to escape. The rate of flow through the passageway 177 serves to govern the period of time during which lubricant is being pumped to the bearings under high pressure in view of the fact that the lubricant in the lower end of reservoir 128 allows piston 138 to descend at a rate of speed governed entirely by the rate of flow of the lubricant through the spiral passageway 177 of the resistance unit. With the timing device thus provided, it can readily be seen that lubricant of different viscosities may be placed in the reservoir A, and with lubricant of any viscosity the amount of lubricant forced to the bearings by the pump mechanism will be the same, due to the fact that by the action of the timing resistance unit lubricant of a high viscosity will consume a longer period of time in allowing valve 154 to open than would be the case with lubricant of a lower viscosity.

Due to this action it is also obvious that, regardless of the temperature of the room in which the machine is operating, the amount of lubricant reaching the bearings in different temperatures will always be the same.

Means in the form of a safety valve must be provided in conduit 72 to prevent an excessive high pressure in the conduit line 18 and to this end a safety valve 180 is provided in the chamber 68 of cylinder 60. The safety valve may comprise a housing 181 in which a one-way check valve 182 is mounted. A cover 183, screw-threadedly mounted on the end of housing 181, has an opening 184 therein and serves both as a seat for spring 185 and a means of escape for the overflow of lubricant. It will of course be understood that this check valve may also be located in the upper end of reservoir 128.

From the detailed description of the operation of my improved apparatus, it will be apparent that a certain sequence of operations will take place at predetermined timed intervals. First, the pump 44 will operate ineffectively merely to discharge oil through the outlet port 158 and there will be no pressure upon the conduit system. Second, when the pump 46 has completely filled the lower end of the reservoir of the controlling device sufficiently to raise the valve 154 to close the port 158, lubricant will be forced under pressure to the conduit system and flow through the measuring units at the bearings. As soon as lubricant is flowing through these units and the pressure is built up sufficiently to force lubricant to flow through the timing resistance unit in the reservoir, the controlling valve assembly 136 will be forced downwardly, and after a period of time, governed entirely by the resistance unit in the reservoir, the assembly will open valve 154, thus relieving the pressure upon the entire conduit system and allowing lubricant to flow through port 158 in the reservoir.

By adjusting the position of member 120 the length of the stroke of pump plunger 50 of pump 46 may readily be controlled and the frequency of the high pressure lubrication may readily be increased or diminished.

When the apparatus of my invention is directly connected with a normally moving part of a machine to be lubricated, it will of course be apparent that the bearings will be supplied with lubricant in accordance with the speed and time of operation of the machine.

While I have illustrated and described a specific embodiment of my invention, it will be understood that changes and modifications may be made in the details of construction, and I do not wish to be limited to the precise details shown but desire to avail myself of all changes within the scope of the appended claims.

I claim as my invention:

1. Lubricating apparatus comprising a lubricant container, a conduit extending therefrom to bearings to be lubricated, an auxiliary reservoir mounted in said container, said auxiliary reservoir having an overflow opening therein, a piston in the auxiliary reservoir, means for pumping lubricant into the reservoir on the lower side of said piston to move said piston to close said overflow opening, means for forcing lubricant through said auxiliary reservoir into said conduit after the overflow opening is closed, and a control unit associated with said pumping and forcing means for governing the period during which lubricant is discharged to said conduit.

2. A pump mechanism comprising a pair of continuously operating pumps, each of said pumps connected with a different end of an auxiliary lubricant reservoir, a valve in said reservoir, one of said pumps normally pumping lubricant into the lower end of said auxiliary reservoir to raise said valve to close an overflow port, the other continuously discharging lubricant into an upper chamber in which said overflow port is located and when said port is closed to a lubricant conduit under high pressure, and means including a flow resistance means associated with said first pump for controlling the period of discharge to the lubricant conduit.

3. A pump mechanism comprising a pair of continuously operating pumps, each of said pumps connected with a different end of an auxiliary lubricant reservoir, a valve in said reservoir, one of said pumps normally pumping lubricant into the lower end of said auxiliary reservoir to raise said valve to close an overflow port, the other continuously discharging lubricant into an upper chamber in which said overflow port is located and when said port is closed to a lubricant conduit under high pressure, said pump adapted to open said overflow port after a period of time, and means including a flow resistance means associated with said first pump for controlling the period of discharge to the lubricant conduit.

4. A pump for a centralized lubricating system comprising an oil reservoir, means for effecting periodic discharges of oil from said reservoir, and means responsive to the viscosity of the oil in said reservoir for regulating the frequency of said periodic discharges.

5. A lubricating system comprising a lubricant container, periodically operating means for creating intermittent pressure periods in said system, and means responsive to the viscosity of the lubricant in said container for controlling the duration of and intervals between the cycle of operation of said periodically operating means.

6. In a lubricating system a unit for effecting the discharge of lubricant from a central reservoir to the system comprising a pump, a conduit connecting said pump with the system, a valve for controlling the discharge of lubricant from said pump to said system, a lubricant circulating system operating responsive to the viscosity of the lubricant in the reservoir, and means responsive to the differential pressures in said conduit and said lubricant circulating system for controlling said valve.

7. A lubricating system comprising a reservoir, a conduit system for distributing lubricant to a plurality of bearings, a continuously operating pump mechanism for intermittently supplying lubricant from said reservoir to said conduit system, and means operable periodically to render said pumping mechanism effective to supply lubricant under pressure to said conduit system, the duration of the effective periods of operation being dependent upon the viscosity of the lubricant.

8. A centralized lubricating system adapted to deliver to each of a plurality of bearings a predetermined quantity of lubricant regardless of the viscosity thereof, comprising a lubricant reservoir, a plurality of bearings, conduits extending from said reservoir to said bearings, metering units adjacent the bearing ends of said conduits, a continuously operating pump in said reservoir, and means in said reservoir operable independently of the rate of flow of lubricant to said metering units for controlling the duration of the discharge of said pump into said system in accordance with the viscosity of the lubricant being pumped.

9. In a centralized lubricating system having a plurality of bearings to be lubricated, a plurality of resistance units, one associated with each of the bearings and constructed and arranged for controlling the flow of lubricant thereto, a lubricant reservoir, conduits extending from said reservoir to said resistance units, a continuously operating pump for transferring lubricant from said source to said conduit system under pressure, and means in said reservoir for relieving the lubricant pressure in said conduit system after the lubricant has been supplied thereto for a period determined by the viscosity of the lubricant.

10. In a centralized lubricating system including a plurality of bearings to be lubricated, a flow resistance unit mounted at each bearing, a lubricant reservoir, a conduit extending from said reservoir to said flow resistance units, a pump mechanism in said reservoir and having its discharge port connected to said conduit, and means operable independently of the rate of flow through said resistance units and responsive to the viscosity of the lubricant in said reservoir for controlling the duration of the discharge of said pump mechanism into said conduit.

11. In a centralized lubricating system having a plurality of bearings to be lubricated, a flow resistance unit mounted at each bearing, a lubricant reservoir, a conduit extending from said reservoir to said flow resistance units, and a pump mechanism constructed and arranged periodically to pump lubricant to said bearings under high pressure, said mechanism including means operable independently of the rate of flow of lubricant to said resistance units and responsive to the viscosity of the lubricant to control the duration of discharge of said pump mechanism to the bearings.

12. A centralized lubricating system adapted to deliver a measured quantity of lubricant to each of a plurality of bearings regardless of the viscosity of the lubricant, comprising a lubricant reservoir, a plurality of bearings, conduits extending from said reservoir to said bearings, a flow resistance unit at each of said bearings, a continuously operating pump receiving lubricant from said reservoir, a valve affecting flow from said pump to said bearings, means for opening said valve, said means including a resistance unit whose effect is dependent upon the viscosity of the lubricant, and means for closing said valve.

13. A lubricating system comprising an oil reservoir, an oil line, a plurality of resistance units associated with said line for apportioning the lubricant supplied thereto among a plurality of bearings, continuously operating automatic means for intermittently discharging oil from said reservoir to said oil line, and means responsive to the viscosity of the oil in said reservoir for controlling the duration of the periods during which oil is discharged into said line.

14. A centralized lubricating system including a plurality of bearings to be lubricated, metering units associated with said bearings for apportioning the supply of lubricant among said bearings in accordance with their respective requirements, a lubricant reservoir, conduits extending from said reservoir to said metering units, a continuously operating pump mechanism in said reservoir for supplying lubricant to said metering units at a high pressure, a valve for by-passing lubricant from said pumping mechanism to said reservoir, a second continuously operating pump, means operated by said second pump for closing said valve, and means dependent upon the viscosity of the lubricant for determining the length of time said valve is maintained closed and thereby determining the period during which lubricant is supplied under pressure to said metering units.

15. A centralized lubricating system including a plurality of bearings to be lubricated, measuring devices associated with said bearings, a central reservoir, conduits extending from said reservoir to said measuring devices, a pumping mechanism in said reservoir, said pumping mechanism operating continuously at a uniform speed and having means for periodically discharging lubricant to said measuring devices under high pressure, and means responsive to the viscosity of the lubricant for varying the duration of the periods during which lubricant is discharged to said devices.

16. In a centralized lubricating system, the combination of a lubricant reservoir, a plurality of bearings to be lubricated, a flow metering unit at each bearing for controlling the flow of lubricant thereto, conduits connecting said flow metering units and said reservoir, a cylindrical chamber in said reservoir having a by-pass opening therein, a pair of pumps in said reservoir, said pumps being connected to opposite ends respectively of said cylindrical chamber, a valve in said chamber operable to close said by-pass, valve operating means reciprocable in opposite directions by the pressure of the lubricant supplied by said pumps respectively, and a high resistance bleed passageway leading from the end of said cylindrical chamber opposite said by-pass opening to said reservoir, whereby the rate of flow of lubricant through said restricted passageway will control the length of the period during which said valve is closed.

17. A central lubricating installation for a plurality of bearings of a mechanism comprising, a branched distribution conduit system leading to said bearings, a source of lubricant pressure, means for periodically admitting said lubricant pressure to said system during operation of the mechanism, and temperature controlled means for regulating the duration of the periods of admission.

18. A central lubricating installation for a plurality of bearings of a mechanism comprising, a branched distribution conduit system leading to said bearings, a source of lubricant pressure, means for periodically admitting said lubricant pressure to said system during operation of the mechanism, and lubricant viscosity controlled means for regulating the duration of the periods of admission.

19. In lubricating apparatus, a combined pump and reservoir mechanism comprising, a hollow base casting, a closure cap therefor, a pump supporting frame suspended from said cap, pump means supported on said frame, a secondary reservoir in said base casting, a conduit extending from said pump means to said secondary reservoir, means in said secondary reservoir and operated by lubricant supplied by said pump means to control the length of the intervals between discharges of lubricant from said secondary reservoir, and a control means connected to said secondary reservoir and responsive to the viscosity of the lubricant for determining the duration of the discharge period.

20. A lubricating apparatus comprising, a container for lubricant, conduits extending therefrom to a plurality of bearings to be lubricated, a pair of continuously operating pumps in said container, a valve closing a by-pass from the discharge side of one of said pumps to said container, a cylinder having one end thereof connected to the discharge side of said last named pump and having its other end connected to the discharge side of the other of said pumps, a piston reciprocable in said cylinder in a position to have its opposite faces acted upon respectively by the discharge from said pumps, a lost motion connection between said piston and said valve, and a high resistance permitting escape of lubricant from said cylinder, said piston, said cylinder, and said resistance vent constituting means for controlling the duration of the periods during which said valve is closed, thereby to control the duration of the periods during which lubricant is supplied through said conduits to the bearings to be lubricated.

21. A pressure supply installation for a system for the lubrication of the bearings of automobiles comprising, a conduit system for supplying lubricant to the bearings to be lubricated, a source of lubricant pressure, means for periodically admitting said lubricant pressure to said conduit system during operation of the mechanism, and lubricant viscosity controlled means for regulating the duration of the periods of admission.

ERNEST W. DAVIS.